Figure 1:
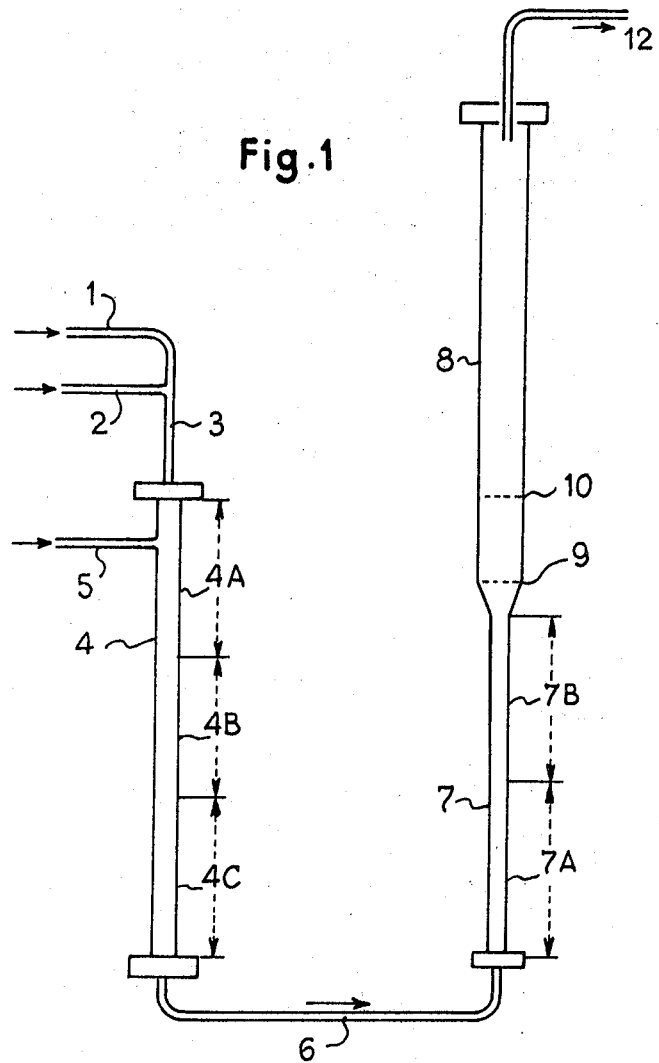

United States Patent

Lhonore et al.

[15] 3,644,100
[45] Feb. 22, 1972

[54] APPARATUS FOR REFORMING HEAVY HYDROCARBONS

[72] Inventors: Pierre Lhonore, Douai; Jacques Quibel, Maisons Laffitte; Michel Senes, Saint-Nazaire, all of France

[73] Assignee: La Societe dite Societ Chimique de la Grande, Paroisse, France

[22] Filed: Sept. 10, 1968

[21] Appl. No.: 758,768

[30] Foreign Application Priority Data

Sept. 12, 1967 France..................120743

[52] U.S. Cl..................23/288 S, 23/288 J, 48/94, 48/214, 165/104, 252/373, 252/473
[51] Int. Cl..................B01j 9/20, C01b 2/22
[58] Field of Search..................48/214, 94, 105, 213, 196; 23/288.38, 288.8, 289, 212, 212 B; 252/373, 377; 165/104

[56] References Cited

UNITED STATES PATENTS

| | | |
|---|---|---|
| 2,460,052 | 1/1949 | Werner..................23/288.3 S X |
| 2,967,145 | 1/1961 | Garihan et al..................23/288.3 S X |
| 3,119,667 | 1/1964 | McMahon..................48/214 UX |
| 3,151,944 | 10/1964 | Stevens et al..................23/288.8 |
| 3,174,834 | 3/1965 | Edwards et al..................23/284 |
| 3,420,643 | 1/1969 | Housset et al..................48/214 |
| 3,459,520 | 8/1969 | Percival..................48/214 |
| 3,476,536 | 11/1969 | McMahon et al..................48/214 |
| 2,912,315 | 11/1959 | Haney..................48/214 |
| 3,533,963 | 10/1970 | Senes et al..................252/466 X |

Primary Examiner—Joseph Scovronek
Attorney—Browdy annd Neimark

[57] ABSTRACT

A process for the catalytic reforming, with steam in a fluidized bed, of heavy hydrocarbons with a boiling point higher than 220° C., carried out under an effective pressure of 2 to 150 bars, in which the reforming mixture is introduced to the catalyst in the form of catalytic particles of a solid solution of nickel oxide and refractory oxides, with a grain size which is between 1 mm. and 60 $\mu$, at a temperature between 300° and 700° C., the volumetric speed on the fluidized bed is between 5 and 0.1 liter/hour per liter of catalyst, the ratio between steam and carbon in moles being between 0.75 and 3.0 and without regeneration or reoxidization of the catalyst.

2 Claims, 3 Drawing Figures

APPARATUS FOR REFORMING HEAVY HYDROCARBONS

The present invention relates to the catalytic reforming of heavy hydrocarbons, particularly hydrocarbons with a final boiling point higher than 220° C., such as the desulfurized or nondesulfurized domestic fuels, crude hydrocarbons, nondesulfurized crude kerosene, paraffin distillates and petroleum residues. The reformed gas can be intended for the production of hydrogen, of gases for the synthesis of ammonia, of methanol or of oxo syntheses, and of town gas.

The conventional methods of gasifying hydrocarbons all make use of thermal processes, which inevitably lead to the formation of carbon black. Hitherto, no process actually known in connection with this procedure is free from this serious disadvantage, of which the effect on the installation investments is very considerable. The formation of carbon constitutes a loss of the initial materials, which are not made use of by the formation of gases, and thus a decrease in the transformation rate, and necessitates at the outlet from the reaction plant the provision of a unit for removing carbon. In addition, the cracking reactions do not permit achieving a complete transformation of the substances to be treated, and an oil remains which has to be eliminated from the departing gas.

The known procedure of catalytic reforming in a fixed bed at most permits treating in correct manner hydrocarbons up to a final distillation point from 200°–250° C., containing an appreciable proportion of aromatic hydrocarbons. In order to be carried out advantageously, this treatment must be effected under well-controlled conditions, such as a high vapor rate (ratio of the number of molecules of water per carbon atom), a well considered heat transfer rate, a progressivity of the heat transmission, a catalytic activity, particularly limited in its cracking power, and the use of carbon-formation inhibitors.

The catalytic reforming reaction in a fixed bed can only be effected with hydrocarbons containing more than 10 carbon atoms per molecule, on account of the decomposition of these compounds which are to be treated, this leading to carbon black and clogging the reactor.

It has already been proposed to convert heavy tars and petroleum residues in a fluidized bed, with the object of manufacturing hydrogen and carbon monoxide, in which process the particles in motion are noncatalytic solids or even catalysts of simple chemical composition, such as the metals nickel, cobalt, molybdenum, or oxides and carbonates of alkali and alkaline earth metals. However, these processes do not avoid the formation of carbon black, require a desulfurization of the starting materials before treatment and at least a regeneration of the catalyst, and consequently the circulation of the catalyst outside the reactor in a reoxidation zone. These functional requirements have not so far permitted the process to be carried out industrially in an economic manner.

A steam reforming process for heavy hydrocarbons in a fluidized bed has been found according to the invention, this process leading directly to reformed gas being obtained without formation of free carbon. The process according to the invention also provides the possibility of heavy hydrocarbons not previously desulfurized being treated, while permitting a gasification of the batch of at least 80 percent. This new catalytic reforming process in a fluidized bed is applicable to any heavy hydrocarbon, possibly not desulfurized, and particularly to fuels, heavy hydrocarbons and kerosene and paraffin and petroleum residues. It is characterized in that it is carried into effect under pressure, up to an effective pressure from 2 to 150 bars, without regeneration or reoxidation of the catalyst.

The pressure is preferably fixed between 30 and 150 bars. It is advantageous to carry out the reforming in a fluidized bed under a pressure of 150 bars, when the reformed gas is intended for the synthesis of ammonia.

The obtaining of a reformed gas under pressure thus permits an important saving in energy to be achieved.

When the reformed gas obtained according to the invention is intended for the preparation of town gas, the reforming reaction is preferably carried out under a pressure which is between 50 and 80 bars. The reforming pressure in a fluidized bed can be in the region of 30 bars when the hydrogen or the gases obtained are intended for the conventional uses connected with the petrochemical industry.

It was discovered when carrying out catalytic reforming tests in a fluidized bed that it is possible, with catalyst compositions in the form of particles with a grain size which is between 1 mm. and 60 $\mu$, having a perfect mechanical behavior, insensitive to the sulfur involved in an organic combination and acting to inhibit thermal cracking and thus of the formation of free carbon and of regeneration of the catalyst, to increase the pressure and to obtain an advantageous reforming, from crude heavy hydrocarbons, with a quantity of vapor which is practically equal to the minimum theorical quantity.

As the decomposition of the hydrocarbons in the presence of steam is of radical type, catalysts have been found which are sufficiently active and selective in a fluidized bed in order to lead to a reformed gas being obtained from heavy hydrocarbons with only a part which is not gasified and which is moreover reduced to the minimum quantity, in the case of particularly heavy materials, such as the paraffin residues, with nonprohibitive vapor ratios (vapor/carbon in moles) which are between 0.75 and 3.0. In practice, without danger of the hydrocarbons coking, the vapor ratio can be lowered to the value corresponding to the absence of steam in the reformed gas.

The volumetric speed of the hydrocarbon vaporized on the fluidized bed is chosen to be between 5 and 0.1 liter/hour per liter of catalyst.

The reforming reaction can optionally be carried out on several fluidized beds. It has been observed that it is advantageous to select the ratio between the height of the catalyst bed and the diameter to be between 0.6 and 7.

The catalyst bed is brought into the suspension by the reagents of the reforming reaction, with which it is optionally possible to associate a neutral carrier gas, such as nitrogen. It is sometimes advantageous to recycle the reformed gas or hydrogen, separated from its condensable residues, to the inlet of the reforming zone in place of nitrogen.

In order to carry out the present invention in advantageous manner, the reforming mixture will be introduced on the fluidized catalyst bed at a temperature which is between 300° and 700° C., preferably between 450° and 600° C. The temperature of the fluidized bed is preferably between 700° and 900° C.

In general, the particles of the catalyst compositions suitable for carrying out the invention contain nickel on a support of refractory oxides. The active metal is nickel, of which the content, calculated as nickel oxide, is between 1 and 40 percent by weight. The refractory oxides, kept in constant ratios, are silicon dioxide, magnesium oxide and zirconium dioxide. These compositions, applicable to the reforming under pressure in a fluidized bed, are characterized in that the magnesium oxide and the zirconium dioxide are in a ratio by weight between magnesium oxide/zirconium dioxide between 1.7 and 2, and preferably close to 1.85, and the magnesium oxide and the silicon dioxide are in a ratio by weight between magnesium oxide/silicon dioxide which is between 4.5 and 5, preferably 4.7. These compositions can optionally contain an activator in the form of alkali or alkaline earth metal compounds, of which the relative proportions are preferably between 0.3 and 3.

In other compositions which can be used in the process of the invention, the nickel as active metal, of which the content calculated as nickel oxide is between 5 and 20 percent, is combined with a refractory support, which is formed particularly by oxides such as magnesium oxide, aluminum oxide, calcium oxide and zirconium dioxide, in which the magnesium oxide, of which the content is between 50 and 60 percent, represents the major proportion of these oxides, the aluminum oxide content being at most equal to 20 percent by weight. These compositions can optionally contain stabilizing elements, such as chromium, potassium, barium, sodium, iron and titanium oxides.

The catalyst compositions containing nickel as active metal, of which the content calculated as nickel oxide is between 8 and 30 percent by weight, and a refractory oxide support formed by magnesium oxide in a content between 0 and 45 percent, aluminum oxide in a content between 0 and 60 percent, calcium oxide in a content below 25 percent and silicon dioxide in a content below 10 percent, are of interest in the process according to the invention. They can contain stabilizers in the proportion of 1 to 5 percent.

A few nonlimiting formulas of these catalyst compositions are given hereinafter by way of example; the different elements of these compositions are in solid solution diffused in the mass, obtained by sintering at high temperature.

The process of the invention, in which the reforming reaction is carried out in the absence of free carbon, offers the advantage of great simplification in procedure; the units for purifying hydrocarbons before treatment and for regenerating the catalyst are omitted. The absence of free carbon constitutes yet another supplementary interest, which is that of avoiding the hydrocarbon losses due to the formation of carbon, as well as the catalyst losses caused by the regeneration and the circulation of the catalyst outside the reforming zone. The absence of circulation of catalyst particles permits the process to be effected industrially, without particular difficulties, operating under pressure.

Examples are given below which illustrate the present invention in a nonlimiting manner.

EXAMPLE 1

A domestic fuel of the empirical formula $C_{15.6}H_{33.2}$, containing several thousand parts per million of sulfur, is treated in a reaction tube with an internal diameter of 80 mm. and a height of 800 mm. containing 1,250 ml. of catalyst with the grain size 120 $\mu$.

The catalyst composition is of the type comprising nickel (as NiO), 6 to 10%, preferably about 8%, magnesium oxide (MgO), 50 to 53%, preferably 52%, zirconium dioxide ($ZrO_2$), 24 to 34%, preferably 28%, silicon dioxide ($SiO_2$), 9 to 12%, preferably 11%.

A series of tests is carried out at atmospheric pressure. The values of the rates of flow (of hydrocarbon, steam and hydrogen), of the vapor ratios, the preheating temperatures of the mixture to be treated and of the catalyst bed, as well as the compositions of the departing gas are set out in the following Table I.

is added to the reactants in order to permit a desulfurization on a palladium and zinc oxide catalyst. The quantity of zinc oxide is saturated in a very short time and thereafter the hydrogen is no longer necessary.

In the second cycle of tests on nondesulfurized domestic fuel (3,350 p.p.m. by weight), the desulfurizing catalysts have been removed, since in the first series of tests the presence of the sulfur did not deteriorate the qualities of the reforming. However, the hydrogen was kept as gaseous carrier of the fuel for assisting its vaporization.

EXAMPLE 2

In a reactor identical with that of Example 1, containing 1,270 ml. of catalyst of the preceding type, with the grain size of 120 $\mu$, a series of reforming tests is carried out under atmospheric pressure on a paraffin distillate of the empirical formula $C_{20}H_{42}$.

In order not to falsify the results of the tests on the paraffin residues, set out in the following Table II, the hydrogen is replaced by nitrogen as gaseous carrier of the liquid in order to assist its vaporization, and so that no ambiguity is introduced into the analysis of the reformed gas.

TABLE II

| Rates of flow | | | Sulphur content in percent | $H_2O$ in C moles per carbon atom | Preheating temperature of mixture | Temperature of catalyst bed | Composition of reformed gas | | | | | |
|---|---|---|---|---|---|---|---|---|---|---|---|---|
| Paraffin distillate ml./hour | Steam in 1/hour | $N_2$ | | | | | $CO_2$ | CO | $H_2$ | $CH_4$ | $C_2$ | $N_2$ |
| 10 | 154.8 | (1) | 2.4 | 10.8 | 490 | 850 | 17.3 | 2 | 55 | 6.8 | 3.9 | 14.9 |
| 17 | 149.5 | (1) | 2.4 | 6.1 | 490 | 850 | 15 | 2.8 | 58.7 | 7.7 | 5.3 | 10 |
| 28.8 | 145 | (1) | 2.4 | 3.4 | 490 | 850 | 20.6 | 5.6 | 53.6 | 10.4 | 6.1 | 4 |
| 37.5 | 145 | (1) | 2.4 | 2.7 | 490 | 850 | 17.6 | 6.1 | 54.6 | 10.6 | 5.6 | 5.5 |
| 37.2 | 134.5 | (1) | 2.4 | 2.5 | 490 | 850 | 14.9 | 6.9 | 56.2 | 12.1 | 6.7 | 3.2 |
| 43.2 | 108 | (1) | 2.4 | 1.75 | 490 | 850 | 14.3 | 8.4 | 52.6 | 13.8 | 8.1 | 2.8 |

¹ Not determined.

The laboratory tests at atmospheric pressure have permitted the following facts to be shown:

a. the possibility of reforming with steam mixtures of heavy hydrocarbons such as the paraffin distillates or fuels, without liberation of carbon;

b. the possibility of carrying out this reaction on catalyst compositions specifically chosen for this purpose and maintained in a fluidized bed;

c. as it is very difficult to free the heavy products from their sulfur, a first process consists in improving the catalyst compositions being investigated in order that they are able to treat, without degradation, products containing several percent of organic sulfur.

EXAMPLE 3

In a reactor identical with that of Example 1, a series of reforming tests is carried out on a paraffin distillate of empirical formula $C_{20}H_{42}$, in a fluidized bed under atmospheric pressure, the reforming being effected on a lesser quantity of catalyst, with the purpose of studying the incidence of the steam proportion ($H_2O$)/C and that of the spatial speed on the qualities of the reformed gas and on the fixed residue.

The reactor contains 1,010 ml. of catalyst of the type employed in the other examples, and with a grain size which is

| Rates of flow | | | Content of sulphur in p.p.m. | $H_2O/C$ in moles per atom | Preheating temperature of mixture | Temperature of catalyst bed | Composition of the reformed gas | | | | |
|---|---|---|---|---|---|---|---|---|---|---|---|
| Fuel in ml./hour | Steam in 1/hour | $H_2$ in 1/hour | | | | | $CO_2$ | CO | $H_2$ | $CH_4$ | $C_2$ |
| 11.3 | 128 | 16.2 | 2,900 | 8.4 | 490 | 840 | 13.8 | 6.4 | 76.6 | 2.1 | 0 |
| 18.8 | 130 | 11.5 | 2,900 | 5.2 | 490 | 840 | 14 | 9.6 | 72.5 | 3.2 | 0 |
| 22.2 | 113 | 12.8 | 2,900 | 3.85 | 490 | 840 | 12.8 | 11.2 | 71.3 | 3.9 | 0 |
| 23.7 | 98.3 | 13.5 | 2,900 | 3.15 | 490 | 840 | 11.4 | 13.1 | 70.5 | 4.3 | 0 |
| 20.8 | 100 | 9.7 | 3,350 | 3.7 | 490 | 840 | 12.9 | 11.9 | 70.3 | 4.2 | 0 |
| 21.8 | 79 | 10 | 3,350 | 2.8 | 490 | 840 | 11.4 | 13.8 | 69.3 | 4.7 | 0 |
| 23.4 | 51.3 | 15.7 | 3,350 | 1.7 | 490 | 840 | 8.3 | 19.1 | 66.9 | 4.9 | 0 |
| 19.9 | 26.6 | 16 | 3,350 | 1 | 490 | 840 | 3 | 23.2 | 68.8 | 4.1 | 0 |

In the first cycle of tests, a partially desulfurized domestic fuel (content 2,900 p.p.m. by weight) is treated and hydrogen between 100 and 630 $\mu$.

The results obtained are set out in the following Table III.

| Rates of flow | | | Content of free sulphur in percent | H₂O in moles per atom of C | Percent gasified | Residue percent by weight | Temperatures | | Composition of the reformed gas | | | | | | |
|---|---|---|---|---|---|---|---|---|---|---|---|---|---|---|---|
| Paraffin distillate in l/hour | Steam l/ hour | N₂ l/ hour | | | | | Pre-heating | Catalyst bed | CO₂ | CO | H₂ | CH₄ | C₂H₄ | C₂H₆ | N₂ |
| 94 | 260 | 13 | 2.4 | 1.9 | 88.2 | 0 | 549 | 832 | 15.3 | 8.8 | 50.5 | 9.8 | 9.0 | 0.8 | 5.8 |
| 121 | 254 | 13.3 | 2.4 | 1.39 | 78.2 | 0 | 549 | 832 | 13.9 | 8.9 | 49.9 | 11.0 | 10.0 | 1.1 | 5.2 |
| 121 | 232 | 14.1 | 2.4 | 1.26 | 69.5 | 0 | 564 | 832 | 15.0 | 8.2 | 48.7 | 10.4 | 10.5 | 0.9 | 6.3 |
| 142.3 | 260 | 13.8 | 2.4 | 1.26 | 60.6 | 0 | 564 | 832 | 14.0 | 7.3 | 48.5 | 12.0 | 10.9 | 1.0 | 5.4 |
| 142.3 | 202 | 12.2 | 2.4 | 0.975 | 79.5 | 0 | 554 | 835 | 10.7 | 9.1 | 44.9 | 15.3 | 13.2 | 1.4 | 5.2 |
| 149 | 162 | 10.2 | 2.4 | 0.744 | 67.5 | 20.0 | 574 | 860 | 4.9 | 8.1 | 34.2 | 26.6 | 19.3 | 1.8 | 5.1 |
| 151 | 194 | 12.5 | 2.4 | 0.884 | 75.4 | 22.6 | 564 | 860 | 9.0 | 9.5 | 44.3 | 16.9 | 13.9 | 1.4 | 5.0 |
| 151 | 184.2 | 13.0 | 2.4 | 0.837 | 74.5 | 19.0 | 554 | 836 | 11.1 | 10.0 | 43.8 | 15.9 | 12.6 | 1.4 | 6.2 |
| 151.5 | 170.7 | 13.8 | 2.4 | 0.776 | 67.8 | 20.0 | 574 | 860 | 10.1 | 13.8 | 46.8 | 13.4 | 9.35 | 1.2 | 5.4 |
| 156.7 | 193 | 15.4 | 2.4 | 0.845 | 68.4 | 21.2 | 574 | 860 | 6.4 | 8.6 | 38.2 | 17.6 | 20.9 | 1.6 | 7.7 |
| 162 | 142 | 9.6 | 2.4 | 0.604 | 68.1 | 20.0 | 574 | 860 | 6.1 | 8.6 | 36.1 | 23.7 | 19.1 | 1.6 | 4.8 |
| 163 | 164.5 | 13.6 | 2.4 | 0.845 | 64.7 | 22.6 | 564 | 860 | 10.2 | 9.2 | 43.4 | 16.1 | 13.0 | 1.2 | 6.9 |
| 164.5 | 164.2 | 11.8 | 2.4 | 0.519 | 57.6 | 18.5 | 564 | 860 | 7.0 | 9.8 | 42.9 | 21.7 | 11.9 | 1.1 | 5.6 |
| 165.5 | 169.5 | 10.6 | 2.4 | 0.725 | 77.2 | 27.0 | 574 | 860 | 6.2 | 12.7 | 43.9 | 18.3 | 13.0 | 1.5 | 4.4 |

It is apparent from reading the above table that the importance of the nongasified residue increases as a function of the decrease in the quantity of steam.

The study of the mineralization of the sulfur during operation has enabled it to be shown that, starting with the same initial hydrocarbon, the quantity of nonmineralized sulfur at the outlet depends on the conversion ratio.

EXAMPLE 4

A pilot installation capable of operating at a pressure which is between atmospheric pressure and 50 bars, and more especially intended for the treatment of 4 to 5 liters per hour of paraffin distillate or another heavy product at 40 bars and at a temperature of the catalyst bed from 700°–900° C.

A nonlimiting diagrammatic representation of this installation, applied to different uses of the reformed gas, is given in FIG. 1 of the accompanying drawing.

The installation represented by the diagram in FIG. 1 of the accompanying drawing consists essentially of three parts: a heating and vaporizing zone for the reactant fluids, a superheating zone for the mixture and a reactor containing the fluidized bed or beds.

The paraffin distillate made liquid at 70° C. and entering by way of the circuit 1 in order to be introduced in liquid form under nitrogen pressure is entrained in its passage towards the vaporizer 4 by way of the circuit 3 by a stream of nitrogen entering through the circuit 2. Arranged concentrically of the hydrocarbon vaporizer is the water vaporizer, into which the liquid water passes through the circuit 5; the two vaporized flows are combined at a temperature in the region of 360° C. The vaporizer comprises three zones; in the zone 4A, the reactant mixtures are preheated up to about 110° C., in the central zone 4B they are vaporized, between 110° and 250° C., and subjected to the first superheating in the lower zone 4C up to 350°–360° C. Through the conduit 6, the mixture is carried towards the superheater 7, comprising the second superheating lower zone 7A for heating up to about 400° C. and then the third superheating zone 7B for heating up to 460° C. After passing through the superheater 7, the mixture consisting of steam, hydrocarbon and nitrogen, superheated from 360° to 460° C., enters the reforming tube 8 in contact with the fluidized beds. The reactor 8 contains fluidization grids 9, 10; separating the fluidized beds, which are two in number; the lower bed No. 1 has a diameter of 80 mm. and a ratio between height and diameter H/D of 1.5 and it contains 600 ml. of catalyst. The reactant fluids at 460° C. penetrate thereinto through the fluidization grid 9, which distributes them in this bed, the temperature of which is kept at 860° C. The reactant fluids then penetrate through the fluidization grid 10 into the upper bed of the same diameter, having an H/D ratio of 0.8, the temperature of which is kept at 700° C. and which contains 320 ml. of catalyst.

Depending on the formula of the treated hydrocarbons, the volumetric speed on the combination of the two beds is 10 carbons/hour/liter of catalyst. The catalyst composition has a grain size from 100 to 630 μ.

The composition of the reformed gas leaving at 12 is given below:

| | |
|---|---|
| CO₂ | 5 to 10 |
| CO | 8 to 14 |
| H₂ | 35 to 45 |
| CH₄ | 13 to 26 |
| C₂H₆ | 1.1 to 1.8 |
| C₂H₄ | 11 to 20 |
| N₂ | 5 to 7 | when a paraffin residue is treated under a pressure of 10 bars, said residue having the following characteristics:

| | | |
|---|---|---|
| Density | 0.913 | Aniline point 73 |
| Distillation | 30% at 300° C. | |
| | 70% at 400° C. | |
| Asphaltes | 0.1% | |
| Ashes | 0.02% | |
| Sulphur | 2% | |

EXAMPLE 5

Figure 2:
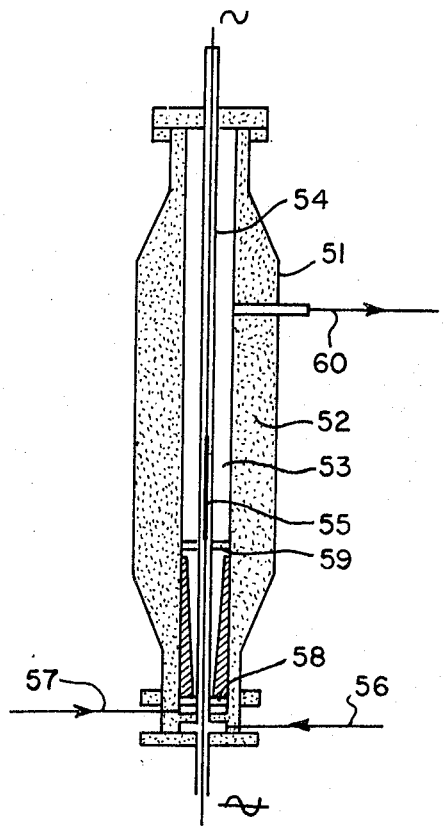
Figure 3:
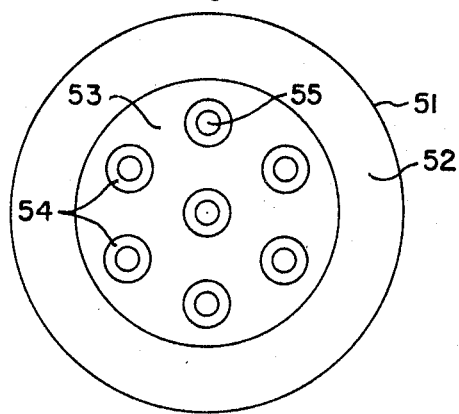

The reactor of an industrial installation under high pressure, shown diagrammatically and in nonlimiting manner in FIG. 2 of the accompanying drawing, consists of a strong pressure-resistant casing 51, heat-insulated internally by means of the heat-insulating material 52, inside which and in the free space 53 the catalyst bed is fluidized. A plurality of heating stacks 54, of which only one appears in the figure, are embedded in the fluidized catalyst mass and ensure the supply of calories necessary for the reaction. An example of the distribution of these stacks inside the fluidized catalyst mass is shown in FIG. 3 of the accompanying drawing, which represents a section of the internal space 53 of the casing 51. The heating of the stacks 54 is assured by electric resistances 55, for example, with a power of 2 kw., supplied by a regulator and individually capable of on-off control. The heating stacks 54 are under equal pressure with the catalyst bed 53, ensuring a thin transfer wall for the calories. The nitrogen is introduced at the base of the reactor through the circuit 56. The nitrogen pressure maintained in the stacks is regulated by the pressure of the catalyst.

The reactant fluids, after superheating, enter the reactor at 57 a through a fluidization grid 58 at the base of the fluidized bed and then pass through the second fluidization grid 59. The vaporization of the hydrocarbons and of the water, as is also the preheating, are assured by coils in electric furnaces having a regulated temperature. The reformed mixture leaves the reactor through the conduit 60.

The metering of the liquids is effected under low pressure at the intake of the pumps.

Operations of relatively long duration were carried out under a pressure of 30 bars, treating an industrial fuel of formula $C_{15}H_{33}$. The spatial velocity of carbon per liter of catalyst is 52 and the vapor ratio of $H_2O/C$, counted as molecules of water per atom of carbon, is from 1.80 to 1.2. The reactant mixture is superheated to 550° C. The reactor contains 2,650 ml. of catalyst of the type indicated in the preceding examples and with the grain size form 60 to 430 μ, while the catalyst bed has a diameter of 150 mm. and a ratio between height and diameter of 2.0.

The mean composition of the reformed gas leaving at 60 is as follows:

|      |      |
|------|------|
| CO$_2$  | 5.4  |
| CO   | 20.5 |
| H$_2$   | 68.4 |
| CH$_4$  | 5.2  |
| C$_2$H$_6$ | 0.5  |
| C$_2$H$_4$ | 0    |

Under these conditions, the hydrocarbon is 100 percent reformed. The sulfur present in the fuel in the amount of 3,000 p.p.m. by weight is completely mineralized to the state of H$_2$S.

When treating a paraffin distillate of the formula identical with that of Example 4, containing 2.4 percent sulfur, under a pressure of 30 bars, in the same reactor and on the same fluidized catalyst bed, a reformed gas is obtained at the outlet, of which the mean composition is as follows:

|      |      |
|------|------|
| CO$_2$  | 7.0  |
| CO   | 9.5  |
| H$_2$   | 32.9 |
| CH$_4$  | 21.2 |
| C$_2$H$_6$ | 1.8  |
| C$_2$H$_4$ | 19.7 |
| N$_2$   | 7.9  | when the reactant mixture was preheated to 550° C. and the fluidized bed was kept at 840° C., the spatial velocity of carbon per liter of catalyst being 20 and the vapor ratio of H$_2$O/C being from 0.98 to 0.75.

Under these conditions, the paraffin distillate is 80 percent reformed. The nongasified residue is 20 percent. About 50 percent of the sulfur present in the paraffin distillate is mineralized to the state of H$_2$S.

What we claim is:

1. An installation for carrying out the catalytic reforming of heavy hydrocarbons with steam in a fluidized bed, comprising a reactor containing a catalyst bed and composed of a pair of high pressure resistant concentric casings having heat insulating material therebetween, and defining a central internal space in which is located means to fluidize said catalyst bed and a plurality of heating stacks including electrical resistances arranged in the internal space of the casing and embedded in the fluidized catalyst mass, and means to maintain said stacks at equal pressure with the central internal space.

2. An installation in accordance with claim 1 wherein said central internal space in which said catalyst mass is fluidized has a height to internal diameter ratio of between 0.6 and 7.

* * * * *